(12) United States Patent
Kienke et al.

(10) Patent No.: US 8,282,168 B2
(45) Date of Patent: Oct. 9, 2012

(54) COMPONENT, IN PARTICULAR FOR A VEHICLE SEAT

(75) Inventors: Ingo Kienke, Wermelskirchen (DE); Jurgen Otto, Burscheid (DE); Mario Budweg, Huckeswagen (DE); Kirubaharan Reginold Albert, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 489 days.

(21) Appl. No.: 12/447,249

(22) PCT Filed: Sep. 14, 2007

(86) PCT No.: PCT/EP2007/008005
§ 371 (c)(1),
(2), (4) Date: Mar. 24, 2010

(87) PCT Pub. No.: WO2008/049489
PCT Pub. Date: May 2, 2008

(65) Prior Publication Data
US 2010/0181816 A1    Jul. 22, 2010

(30) Foreign Application Priority Data
Oct. 27, 2006  (DE) .......................... 10 2006 051 403

(51) Int. Cl.
*B60N 2/235*  (2006.01)

(52) U.S. Cl. ................................. 297/367 R

(58) Field of Classification Search .............. 297/367 R, 297/367 P, 367 L
See application file for complete search history.

(56) References Cited

U.S. PATENT DOCUMENTS

| 5,318,261 | A | | 6/1994 | Petershofer et al. | |
|---|---|---|---|---|---|
| 5,547,255 | A | * | 8/1996 | Ito et al. | 297/367 R |
| 5,564,785 | A | * | 10/1996 | Schultz et al. | 297/367 R |
| 7,497,520 | B2 | * | 3/2009 | Assmann | 297/367 R |
| 2011/0062760 | A1 | * | 3/2011 | Zellmann et al. | 297/367 R |

FOREIGN PATENT DOCUMENTS

| DE | 76 07 051 | | 10/1976 |
|---|---|---|---|
| EP | 1 408 242 | A1 | 4/2004 |
| EP | 1 838 488 | A1 | 10/2007 |
| FR | 2 712 045 | A1 | 5/1995 |
| WO | 93 01418 | | 1/1993 |
| WO | 2006 040276 | A1 | 4/2006 |
| WO | 2006 040303 | A2 | 4/2006 |

OTHER PUBLICATIONS

International Search Report for application No. PCT/EP2007/008005 mailed Jan. 18, 2008.

* cited by examiner

*Primary Examiner* — Rodney B White
(74) *Attorney, Agent, or Firm* — Fletcher Yoder P.C.

(57) ABSTRACT

A component for a vehicle seat includes a plurality of plate-like elements generally parallel to one another, with pairs of the elements being connected, such as by welding. At least one element of each pair has a bend that creates a gap spacing with respect to the other element of the pair. Each element is connected to a next element to form a further pair in the region of the spacing.

13 Claims, 3 Drawing Sheets

COMPONENT, IN PARTICULAR FOR A VEHICLE SEAT

CROSS REFERENCE TO RELATED APPLICATIONS

This application claims priority from and the benefit of PCT Application No. PCT/EP2007/008005, filed on Sep. 14, 2007; and German Patent No. DE 10 2006 051 403.3, filed on Oct. 27, 2006; both entitled "Component, in Particular for a Vehicle Seat", which are herein incorporated by reference.

BACKGROUND

The invention relates to a component, in particular for a vehicle seat, with at least three, preferably at least four plate-like elements which are connected to one another and are oriented at least approximately parallel to one another, wherein pairs of elements comprising elements which are at least partially in contact with one another are in each case directly connected to one another, in particular welded, in the region in which they are in contact.

International patent application WO 2006/040276 A1 discloses a component according to the invention for a vehicle seat. Said component comprises a layered arrangement of approximately identically thick sheet-metal plates which are in contact with one another in a sheet-like manner, with each sheet-metal plate being connected to the sheet-metal plate located directly therebelow by means of laser welding, with a pair of plates being formed. While the topmost sheet-metal plate is, of course, easily accessible to the laser beam which acts from above, the welding of the pairs of plates located lower down takes place in each case in the region of recesses in the sheet-metal plates which are located thereabove and through which the laser beam reaches its location of action.

In the case of small components of complex construction, for example backrest inclination adjusters of vehicle seats, the construction space available for providing a multiplicity of such recesses may possibly not be sufficient.

Of course, it is conceivable also to manufacture a layered component by two sheet-metal plates being placed one on the other and being welded together, and subsequently a further sheet-metal plate being placed onto said pair of plates and being welded to the sheet-metal plate located therebelow, and for this operation to be repeated until the desired layering height is achieved. However, a welding bead generally arises in the region of the weld and interferes with the next sheet-metal plate being placed on, and therefore has to be removed in a complicated manner beforehand.

It is known from patent application DE 10 2005 001 606 to connect three sheet-metal plates of differing thickness lying one on another together by means of laser welding. However, this operation requires a special sequence of the sheet-metal plates in a manner such that the laser beam impinges on the thinnest sheet-metal plate and welds the latter to the thickest sheet-metal plate through the central sheet-metal plate. Furthermore, because of the lower application of heat and correspondingly reduced distortion, the precision is basically better when welding together two sheet-metal plates than when connecting three sheet-metal plates by means of a single weld seam.

SUMMARY

The invention is based on the problem of providing a component which is built up in layers from plate-like elements which are in particular of approximately identical thickness, in which the connection between the elements has as little as possible adverse effect on the construction space available on the component.

The problem is solved according to the invention in that, in the case of a component of the generic type, in each case at least one element of each pair of elements has a bend which provides a local, gap-like spacing (gap size s) with respect to the other element of the same pair of elements, and the connection to the next element takes place in the region of said spacing, with a further pair of elements being formed.

According to a particular development of the invention, the two outer pairs of elements are designed in a minor-inverted manner with respect to each other, with the mirror plane running in the connecting region of the central pair of elements. The connection between the elements which are partially in contact with one another is preferably designed as a laser weld.

The invention is particularly suitable for use in inclination adjusters for vehicle seats, in particular in wobble mechanisms, which have a first fitting part and a second fitting part which can be adjusted in angle in relation to the first fitting part. In this case, the central pair of elements advantageously forms the first fitting part to which outer elements which are provided with toothings are connected, with the outer elements being designed as toothed wheels which are provided with an external toothing and can each be brought into engagement with a fitting plate, which is provided with an internal toothing, of the second fitting part. A particularly favorable transmission of force can be obtained here by, in the design position, the toothed wheels, which are in each case in engagement with one another, either being aligned with respect to one another or offset in such a manner that a load-induced deformation takes place in the direction of a defined contact between the components concerned.

DRAWINGS

The figures illustrate embodiments of the invention which are by way of example and differ schematically.

DETAILED DESCRIPTION

Figure 1:
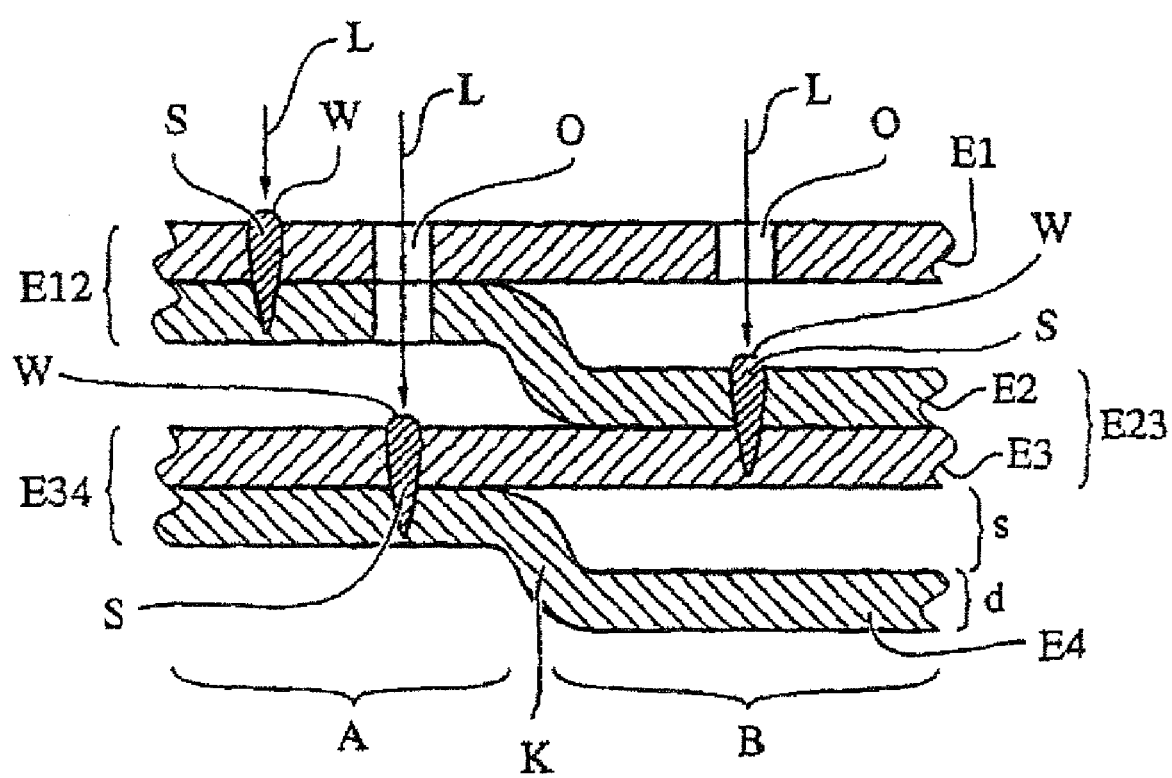
FIG. 1 shows a component according to a first development of the invention.

The component shown in FIG. 1 comprises four plate-like elements E1, E2, E3 and E4 which run substantially parallel to one another and are made from steel sheet and of which in each case adjacent elements E1, E2 and E2, E3 and E3, E4 form a total of three pairs of elements E21, E23 and E34. In the exemplary embodiment, the thickness d is identical for all of the elements E1 to E4.

Each pair of elements E12, E23, E34 has a first region (referred to by A on the pair of elements E34) in which the relevant elements (for example E3, E4) are directly in contact with each other and are connected to each other by a weld seam S. The welding connection of all of the pairs of elements E12, E23, E34 takes place by means of a laser beam L from one side of the component (from the upper side thereof in FIG. 1), with openings O in the upper pairs of elements E12 and E23 permitting the passage of the laser beams L to the pairs of elements E23 and E34 located therebelow.

Furthermore, at least one element E1 to E4 of each pair of elements E12, E23, E34 is provided with a bend (referred to by K on the pair of elements E34), i.e. a region in which the plate-like element (here E4) is bent away through a first angle (90° in the exemplary embodiment) from the adjacent element (here E3) and is then bent back again in the opposite direction through a substantially identical angle. On the other side of the bend K, a region, in which the elements E1 and E2, E2 and E3 and E3 and E4 forming a pair of elements E12, E23, E34 are spaced apart from one another in a gap-like manner, is therefore produced in each pair of elements E12, E23, E34. On the pair of elements E34, this region is referred to by B with the associated gap size s.

This design has the effect that the welding beads W of the weld seams S of a pair of elements (for example E34) do not interfere with an adjacent pair of elements (here E23), since the welding bead W in question evolves into the gap in the region B. Furthermore, in the exemplary embodiment according to FIG. 1, given an appropriately large design, the openings O also create the necessary clearance. Nevertheless, the gap is helpful for preventing distortion in the elements located above the weld seam. Furthermore, the thickness of the welded assembly can be set with great precision by means of bends K which are designed in a compensating manner, even when the individual elements have thickness tolerances.

Figure 2:
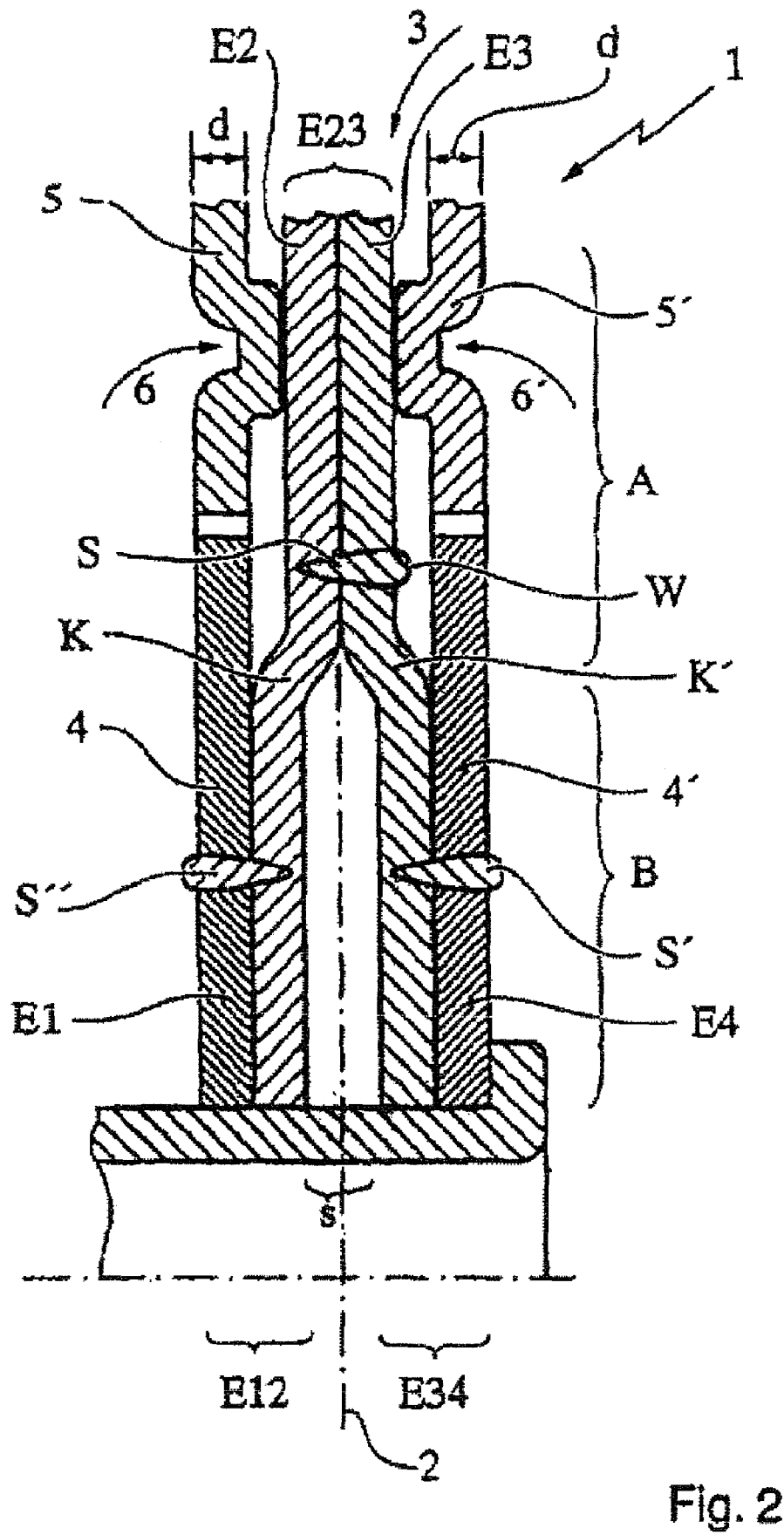
FIG. 2 shows a first wobble mechanism which is shown as an extract and is designed according to the invention.

In the case of wobble mechanism 1 which is illustrated in FIG. 2 and is shown in highly simplified form with numerous components being omitted, openings O cannot be provided because of the highly complex construction, and therefore the region B obtains particularly important significance. With regard to the construction and the function of inclination adjusters of this type, reference is expressly made to the publication WO 2006/040303 A2.

The wobble mechanism 1 which is provided for adjusting the backrest inclination and is designed in an approximately mirror-inverted manner with respect to a central plane 2 comprises a first fitting part 3 which is connected, for example, rigidly to the seat part of the seat in question. The fitting part 3 comprises a central pair of elements E23 which in each case has a region A of direct contact with each other and a region B with a spacing (gap size s) with respect to each other. Between the regions A, B, the two elements E2, E3 of the pair of elements E23 are each provided with bends K, K' which point away from each other. The elements E2 and E3 are connected to each other in the region A of direct contact by means of a weld seam S with a welding bead W.

Further plate-like elements E1 and E4, which are designed as externally toothed toothed wheels 4, 4', are placed from the outside onto the pair of elements E23, with the pairs of elements E12 and E34 being formed. The pairs of elements E12 and E34 are likewise joined by means of weld seams S', S''.

During the manufacturing of the fitting part 3, the elements E2 and E3 are first of all welded to each other. The outer elements E1 and E4 are subsequently placed onto said assembly and connected to the pair of elements E23.

By means of the bends K, K', the toothed wheels 4, 4' in the region of the weld seam S of the central pair of elements E23 are spaced apart from the elements E2 and E3 such that the welding bead W does not interfere with the placing on thereof and therefore does not have to be removed beforehand.

The externally toothed toothed wheels 4, 4' are in engagement with fitting plates 5, 5' which, as components fixed on the backrest, are equipped with an internal toothing. The internal toothing has in each case at least one tooth more than the external toothing of the toothed wheels 4, 4' with which it is in engagement. By this means, when the wobble mechanism 1 is actuated, the toothed wheels 4, 4' can roll along the internal circumference of the fitting plates 5, 5'.

In this case, the toothings of the toothed wheels 4, 4' and of the fitting plates 5, 5', which toothings are punched from semi-finished products of identical thickness d, are always aligned fully overlapping with regard to their thickness d such that, in the unloaded state, the entire cross section of material is used for the transmission of force. In this case, forward bulges 6, 6' which point in the direction of the fitting part 3 on the other side of the internal toothing on the fitting plates 5, 5' serve for the axial guidance. As an alternative, it is conceivable to place spacers laterally onto the fitting part 3.

Figure 3:
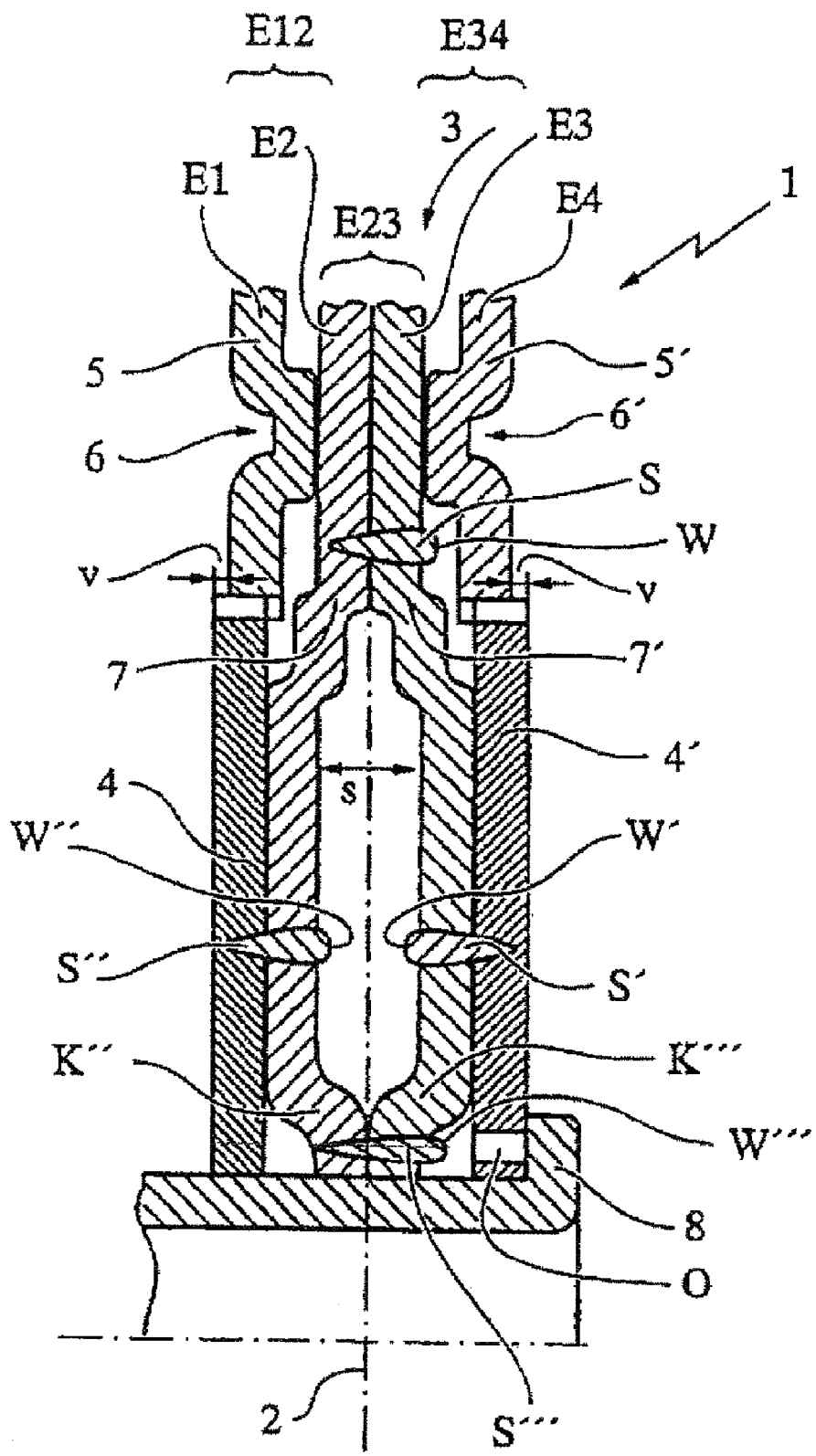
FIG. 3 shows a wobble mechanism, which is illustrated as an extract, according to a different embodiment of the invention.

In the development according to FIG. 3, the fitting plates 5, 5' are offset inward (offset v) slightly, for example ⅕ to 1/10 of their thickness d, in the direction of the central plane 2 in relation to the toothed wheels 4, 4', which are identical in the exemplary embodiment but may possibly also differ in thickness, and therefore there is not full overlapping in the region of the toothing. Under normal load conditions, the frictional forces during the adjustment of the wobble mechanism 1 are reduced by this means. In the event of loading of the wobble mechanism 1, said offset v results in the fitting plates 5, 5' being deformed inward at their toothed ends in the direction of the fitting part 3 until they come into contact with the forward bulges 6, 6' and/or additional chamfers 7, 7' of the fitting part 3. This prevents uncontrolled spreading apart of the fitting plates 5, 5'.

The wobble mechanism according to FIG. 3 is welded in a different sequence. The inner plates of the fitting part 3 (elements E2, E3), which plates are still separate, are first of all connected to the fitting plates 5, 5', with the pairs of elements E12 and E34 (weld seams S' and S'') being formed. The pairs of elements E12 and E34 are subsequently placed one onto the other and connected outside the fitting plates 5, 5' in the region of the elements E2 and E3 to the weld seam S. The welding beads W' and W''' therefore point into the spacing s of the fitting part 3. A further weld seam S''' connects the elements E2, E3 in the region of the subsequent contact with the bearing sleeve 8 where they come into contact with each other by means of further bends K'', K'''. For this purpose, the laser beam L is guided through a small opening O in the fitting plate 5'.

By this means, the fitting plate 3 obtains greater axial rigidity and improved contact with the bearing sleeve 8.

The invention claimed is:

1. A component for a vehicle seat, comprising at least three plates which are connected to one another and are oriented at least approximately parallel to one another, wherein pairs of plates at least partially in contact with one another are in each case directly connected to one another by a connection in a first region in which they are in contact, wherein at least one plate of each pair of plates has a bend which creates a local gap with respect to the other plate of the same pair of plates, and wherein each plate is connected to a next plate to form a further pair of plates in a second region of said gap.

2. The component as claimed in claim 1, wherein the at least three plates comprise a first outer pair of plates, a second outer pair of plates, and a central pair of plates, wherein the first and second outer pairs of plates are designed in a mirror-inverted manner with respect to each other, with a mirror plane that runs in the first region of the central pair of plates.

3. The component as claimed in claim 1, wherein the connection comprises a laser weld.

4. The component as claimed in claim 1, wherein the component is an inclination adjuster which has a first fitting part and a second fitting part angularly adjustable with respect to the first fitting part.

5. The component as claimed in claim 4, wherein a central pair of plates forms the first fitting part to which outer plates are connected.

6. The component as claimed in claim 5, wherein the outer plates are toothed.

7. The component as claimed in claim 5, wherein the outer plates are designed as toothed wheels which are provided with an external toothing and can be brought into engagement with respective fitting plates, which are provided with an internal toothing, of the second fitting part.

8. The component as claimed in claim 7, wherein the engaged toothings of the toothed wheels and the respective fitting plates are aligned with one another.

9. The component as claimed in claim 7, comprising at least one externally toothed wheel and at least one internally toothed fitting plate, wherein the engaged toothings of the at least one externally toothed wheel and the at least one internally toothed fitting plate are offset axially with respect to one another.

10. The component as claimed in claim 9, wherein the component is substantially symmetrical in relation to a central plane, and the at least one internally toothed fitting plate is offset inward in relation to the at least one externally toothed wheel to undergo deformation in the direction of the central plane in the event of loading in a third region of the engaged toothings.

11. The component as claimed in claim 1, comprising at least four plates.

12. The component as claimed in claim 1, wherein the connection comprises welding.

13. The component as claimed in claim 1, wherein the component comprises a wobble mechanism.

* * * * *